(12) United States Patent
Ojima et al.

(10) Patent No.: US 12,024,208 B2
(45) Date of Patent: Jul. 2, 2024

(54) STEERING DEVICE FOR AUTOMATIC DRIVING VEHICLE

(71) Applicant: HONDA MOTOR CO., LTD., Tokyo (JP)

(72) Inventors: Yosuke Ojima, Tokyo (JP); Munetsugu Hanji, Tokyo (JP); Hayato Miyakawa, Tokyo (JP); Kunimichi Hatano, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 346 days.

(21) Appl. No.: 17/679,542

(22) Filed: Feb. 24, 2022

(65) Prior Publication Data

US 2022/0306163 A1 Sep. 29, 2022

(30) Foreign Application Priority Data

Mar. 26, 2021 (JP) .................................. 2021-052983

(51) Int. Cl.
*B60W 60/00* (2020.01)
*B60W 10/20* (2006.01)
*B60W 10/30* (2006.01)
*B60W 40/08* (2012.01)
*B60W 50/14* (2020.01)

(52) U.S. Cl.
CPC ........ *B60W 60/0053* (2020.02); *B60W 10/20* (2013.01); *B60W 10/30* (2013.01); *B60W 40/08* (2013.01); *B60W 50/14* (2013.01); *B60W 2420/403* (2013.01); *B60W 2510/20* (2013.01); *B60W 2540/18* (2013.01); *B60W 2540/223* (2020.02)

(58) Field of Classification Search
CPC ................. B60W 10/20; B60W 10/30; B60W 2420/403; B60W 2510/20; B60W 2540/18; B60W 2540/223; B60W 40/08; B60W 50/14; B60W 60/0053
See application file for complete search history.

(56) References Cited

U.S. PATENT DOCUMENTS

| 11,370,459 | B2* | 6/2022 | Shimizu | B60W 40/08 |
| 2017/0106786 | A1* | 4/2017 | Ebina | G08B 5/36 |
| 2017/0166237 | A1* | 6/2017 | Oh | B62D 1/28 |
| 2018/0319407 | A1* | 11/2018 | Lisseman | B60W 10/20 |

(Continued)

FOREIGN PATENT DOCUMENTS

JP 6187090 B2 8/2017

*Primary Examiner* — Tyler J Lee
(74) *Attorney, Agent, or Firm* — Armstrong Teasdale LLP (57) ABSTRACT

When the driving mode of a vehicle is switched from an automatic driving mode to a manual driving mode in response to steering of the steering wheel by a driver while the vehicle is traveling in the automatic driving mode, a control device determines whether a recognized steering angle which is the steering angle of the steering wheel recognized by the driver is near a neutral position or near a one turn position according to the grip positions on the steering wheel, and when the determined recognized steering angle differs from an actual steering angle, the control device changes a ratio between the steering angle of the steering wheel and a steered angle of a wheel such that the steered angle approaches a recognized steered angle corresponding to the recognized steering angle.

6 Claims, 5 Drawing Sheets

(56) References Cited

U.S. PATENT DOCUMENTS

2019/0025823 A1* 1/2019 Christiansen .......... B60K 35/60
2019/0337566 A1* 11/2019 Weidig ................... B62D 15/02
2021/0078607 A1* 3/2021 Shimizu ............... G06V 40/107

* cited by examiner

STEERING DEVICE FOR AUTOMATIC DRIVING VEHICLE

TECHNICAL FIELD

The present invention relates to a steering device for an automatic driving vehicle which can travel in an automatic driving mode.

BACKGROUND ART

In a vehicle driving control device which can switch between an automatic driving mode in which automatic travel control is performed to make the own vehicle travel automatically and a manual driving mode in which the automatic travel control is stopped and the driver can drive the vehicle manually, it is known to switch the driving mode from the automatic driving mode to the manual driving mode when an amount of steering of the steering wheel performed by the driver exceeds a preset determination threshold value (see JP6187090B2).

However, during automatic driving such as when performing parking assist or low-speed driving assist in an urban area, the steering wheel may be rotated (turned) 360 degrees or more. In such a case, if the driving mode is simply switched from the automatic driving mode to the manual driving mode as in the vehicle driving control device of JP6187090B2 when the driver operates the steering wheel in emergency for example, the driver may misunderstand the state of the vehicle. Namely, a situation may occur where the driver thinks that the vehicle is moving approximately straight (the steering angle is near 0 degrees) when the driver grips the steering wheel though actually the vehicle is in a steered state (the steering angle is near 360 degrees). In such a situation, since there is a discrepancy between the traveling direction of the vehicle recognized by the driver and the actual traveling direction of the vehicle, the driver may not be able to properly perform driving operation and/or may have a sense of incongruity.

SUMMARY OF THE INVENTION

In view of such background, a primary object of the present invention is to reduce the driver's sense of incongruity in a case where the steering angle of the steering wheel recognized by the driver differs from the actual steering angle when the driving mode is switched from the automatic driving mode to the manual driving mode.

To achieve the above object, one embodiment of the present invention provides a steering device (10) for an automatic driving vehicle (1) which can switch a driving mode between an automatic driving mode and a manual driving mode, the steering device comprising: a steering wheel (6) which is configured to be rotatable one turn (360 degrees) or more in each of leftward and rightward directions from a neutral position (0 degrees); a steering mechanism (11) configured to change a ratio (K) between a steering angle ($\beta$) of the steering wheel and a steered angle ($\alpha$) of a wheel (3); a control device (15) that changes the ratio of the steering mechanism; and a grip position detection device (7) that detects grip positions on the steering wheel gripped by a driver, wherein when the driving mode is switched from the automatic driving mode to the manual driving mode in response to steering of the steering wheel while the automatic driving vehicle is traveling in the automatic driving mode, the control device determines whether a recognized steering angle ($\beta$re) which is the steering angle of the steering wheel recognized by the driver is near the neutral position (0 degrees) or near a one turn position (360 degrees) according to the grip positions on the steering wheel (ST4 to ST7), and when the determined recognized steering angle differs from an actual steering angle (ST8: No), the control device changes the ratio such that the steered angle approaches a recognized steered angle ($\alpha$re) corresponding to the recognized steering angle (ST9).

According to this configuration, when the recognized steering angle (the steering angle recognized by the driver) differs from the actual steering angle, the control device changes the ratio such that the steered angle approaches the steered angle recognized by the driver, whereby the steered angle of the wheel can be made approach the recognized steered angle (the steered angle of the wheel corresponding to the recognized steering angle). Thereby, the driver's sense of incongruity can be reduced.

Preferably, the control device changes the ratio such that the steered angle approaches the recognized steered angle while the driver is steering the steering wheel.

According to this configuration, since the ratio is changed while the driver is steering the steering wheel, it is possible to prevent the wheel from being steered when the driver is not steering the steering wheel. Thereby, the driver's sense of incongruity can be reduced even further.

Preferably, in a case where the grip positions are straight-travel grip positions (GPS) that constitute left and right parts of the steering wheel to be gripped when the steering wheel is in the neutral position (ST4: Yes), the control device determines that the recognized steering angle is near the neutral position (ST6), and in a case where the grip positions are positions other than the straight-travel grip positions (ST4: No), the control device determines that the recognized steering angle is near the one turn position (ST7).

According to this configuration, when the driver grips the straight-travel grip positions, it is possible to determine that the driver recognizes that the vehicle is traveling straight or that the steering wheel is near the neutral position. On the other hand, when the driver grips a position other than the straight-travel grip positions, it is possible to determine that the driver recognizes that the vehicle is not traveling straight or that the steering wheel is not near the neutral position but near the one turn position.

Preferably, the steering device further comprises an imaging device (5) provided to capture an image of arms of the driver, wherein the control device determines whether the arms of the driver are crossed based on a result of image capture by the imaging device (ST5), and in a case where it is determined that the arms of the driver are crossed (ST5: Yes) even when the steering wheel is near the neutral position or near the one turn position (ST2: Yes or ST3: Yes), the control device determines that the recognized steering angle is near the one turn position (ST7).

According to this configuration, when the arms of the driver are crossed, it can be determined that the driver recognizes that the steering wheel is rotated from the neutral position, namely, that the recognized position is near the one turn position.

Preferably, the steering device further comprises an indicator (36) provided on the steering wheel, wherein the control device is configured to control the indicator, and the control device decides recommended grip positions (GP), which are positions on the steering wheel to be gripped, according to the steering angle, and controls the indicator to display the recommended grip positions.

According to this configuration, since the control device controls the indicator to display the recommended grip positions to be gripped by the driver, it is possible to prevent the driver from erroneously recognizing the steering angle of the steering wheel.

Preferably, the control device makes a color of the indicator different between a recommended grip position for a right hand (GPR) and a recommended grip position for a left hand (GPL).

According to this configuration, the driver can recognize the recommended grip position for the right hand and the recommended grip position for the left hand separately from each other, and therefore, the driver can recognize the recommended grip positions accurately.

According to the foregoing configuration, it is possible to reduce the driver's sense of incongruity in a case where the steering angle recognized by the driver differs from the actual steering angle when the driving mode is switched from the automatic driving mode to the manual driving mode.

DETAILED DESCRIPTION OF THE INVENTION

Figure 1:
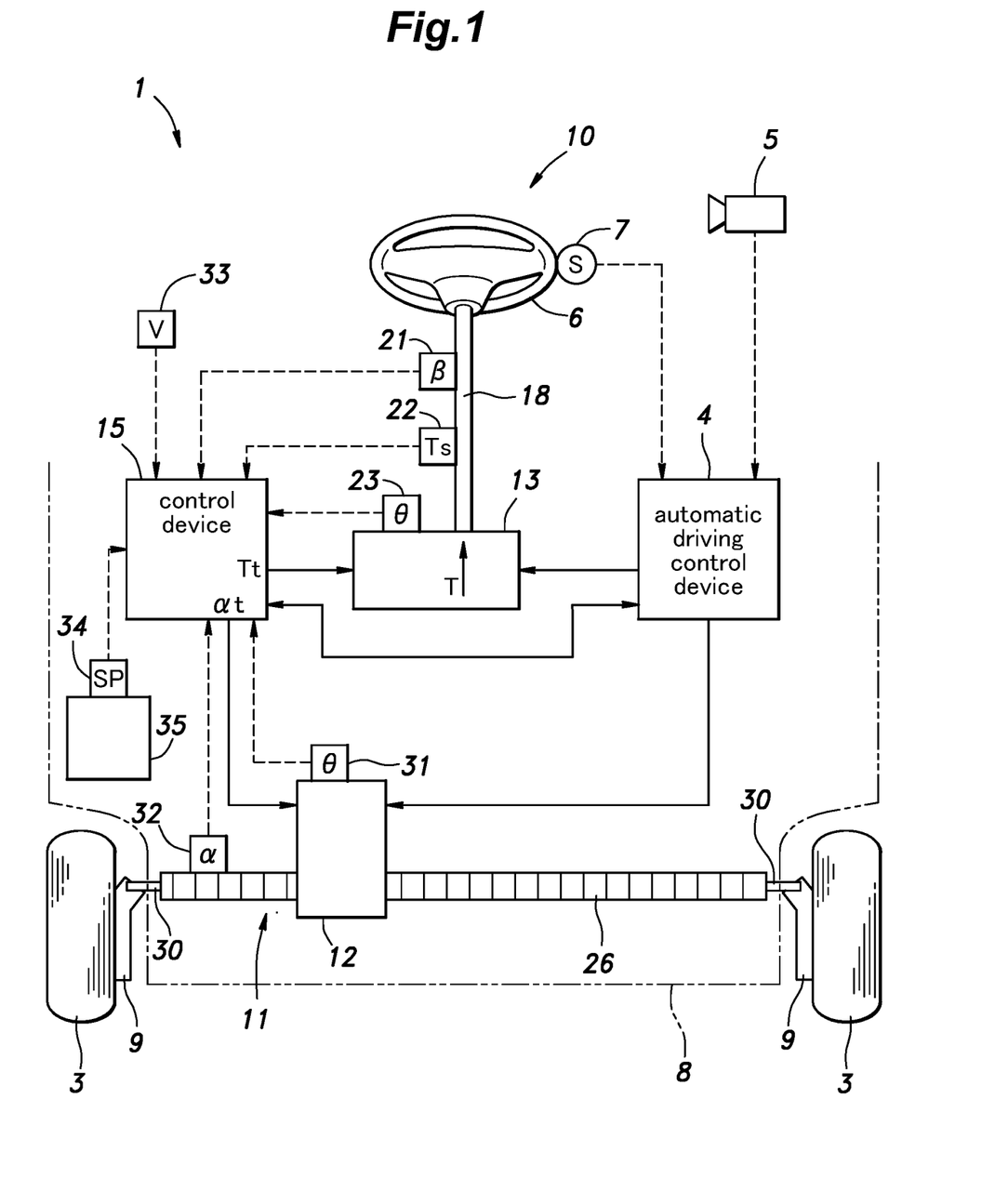
FIG. 1 is a configuration diagram of a steering device according to an embodiment of the present invention.

In the following, a steering device 10 for a vehicle 1 according to an embodiment of the present invention will be described. First, description will be made of the vehicle 1 and an automatic driving function that the vehicle 1 is provided with. As shown in FIG. 1, the vehicle 1 provided with the steering device 10 is a four-wheeled automobile having left and right front wheels 3 and left and right rear wheels (not shown in the drawings). The vehicle 1 is an automatic driving vehicle provided with an automatic driving control device 4 that executes automatic driving control (hereinafter, automatic driving) at level "2" or higher by combining various kinds of vehicle control. The automatic driving control device 4 may be a known type which includes a CPU which executes operation processing according to a program so that the automatic driving control device 4 executes various types of vehicle control to perform automatic driving.

The automatic driving control device 4 receives instruction to start or end the execution of the automatic driving from a vehicle occupant via a driving mode selector switch, and accordingly switches the driving mode between an automatic driving mode and a manual driving mode. The driving mode selector switch may be a mechanical switch disposed at an appropriate position in the cabin or a graphical user interface (GUI) switch displayed on a touch panel, and may be configured by a navigation interface.

In the automatic driving mode, the automatic driving control device 4 performs all driving operations including acceleration, deceleration, and steering of the vehicle 1, operation of indicator lights, monitoring of the surroundings and occupants, etc. In the manual driving mode, the automatic driving control device 4 does not control the vehicle 1, and all driving operations are performed by the driver.

The vehicle 1 is provided with an occupant monitoring device which includes an interior camera 5 serving as an imaging device that captures an image of the driver seated in the driving seat and a gripping sensor 7 that detects a gripping state of the steering wheel 6. The interior camera 5 is, for example, a digital camera that uses a solid imaging element such as a CCD or a CMOS. The gripping sensor 7 is a sensor that detects whether the driver is gripping the steering wheel 6 and outputs a detection signal indicating whether the steering wheel 6 is gripped or not. The gripping sensor 7 is preferably formed of an electrostatic capacitance sensor or a piezoelectric element provided on the steering wheel 6, for example.

The automatic driving control device 4 determines whether the driver is in an abnormal state based on the image captured by the interior camera 5 (result of image capture). For example, the automatic driving control device 4 extracts a face region of the driver from the captured image by using a known image analysis method. Further, the automatic driving control device 4 determines whether the driver is duly paying attention to the vehicle surroundings based on various information extracted from the extracted face region. Also, during automatic driving at level "1," the automatic driving control device 4 detects whether the driver is gripping the steering wheel 6 based on the signal from the gripping sensor 7, and if not, determines that the driver is not duly paying attention to the vehicle surroundings.

Next, the steering device 10 will be described. The steering device 10 is a vehicle steering device of a steer-by-wire (SBW) type. The left and right front wheels 3 are supported on a vehicle body 8 (in FIG. 1, only an outline of a lower portion thereof is shown) via respective knuckles 9 such that a steered angle $\alpha$ can be changed, and function as steered wheels. The steered angle $\alpha$ refers to an angle of the front wheels 3 relative to the fore and aft direction in plan view. The steering device 10 changes the steered angle $\alpha$ of the front wheels 3.

The steering device 10 includes a steering wheel 6 rotatably provided in the vehicle body 8, a steering mechanism 11 that steers the front wheels 3, a steering actuator 12 that gives a driving force to the steering mechanism 11, and a reaction force actuator 13 that gives a reaction force torque T to the steering wheel 6. In addition, the steering device 10 includes a control device 15 that controls the reaction force actuator 13 and the steering actuator 12. The steering device 10 may be constituted as a redundant system including multiple steering actuators 12, multiple reaction force actuators 13, and multiple control devices 15.

The steering wheel 6 receives a steering operation performed by the driver. The steering wheel 6 is attached to the rear end of a steering shaft 18 rotatably supported by the vehicle body 8 and rotates integrally with the steering shaft 18. The steering shaft 18 is rotatably supported by a steering column (not shown in the drawings) provided in the vehicle body 8 and the rear end of the steering shaft 18 protrudes rearward from the steering column. The steering wheel 6 is configured to be rotatable one turn or more in each of leftward and rightward directions from the neutral position.

The reaction force actuator 13 is an electric motor and is coupled with the steering shaft 18 via gears. When the reaction force actuator 13 is driven, the driving force is transmitted to the steering shaft 18 as a rotational force. Thus, the reaction force actuator 13 when rotated applies a torque to the steering wheel 6. The torque applied to the steering wheel 6 from the reaction force actuator 13 according to the steering operation is referred to as a reaction force torque T.

The steering device 10 includes a steering angle sensor 21 that detects a rotation angle of the steering shaft 18 about an axis as a steering angle $\beta$. The steering angle sensor 21 may be a known rotary encoder. Also, the steering device 10 includes a torque sensor 22 that detects a torque applied to the steering shaft 18 as a steering torque Ts. The torque sensor 22 detects the steering torque Ts applied to a part of the steering shaft 18 between the steering wheel 6 and the reaction force actuator 13. The steering torque Ts is determined by an operation torque applied to the steering wheel 6 by the driver and the reaction force torque T applied to the steering shaft 18 by the reaction force actuator 13. The torque sensor 22 may be a known torque sensor such as a magnetostriction type torque sensor or a strain gauge, or may be a sensor that uses an estimated value based on the value of an electric current flowing through the electric motor of the reaction force actuator 13.

The steering device 10 includes a first rotation angle sensor 23 that detects a rotation angle $\theta$ of the reaction force actuator 13. The first rotation angle sensor 23 may be a known resolver or rotary encoder.

The steering mechanism 11 includes a rack shaft 26 extending in the vehicle width direction. The rack shaft 26 is supported in a gear housing (not shown in the drawings) to be movable in the vehicle width direction. The left and right end portions of the rack shaft 26 are connected to the respective knuckles 9, which support the left and right front wheels 3, via respective tie rods 30. Movement of the rack shaft 26 in the vehicle width direction changes the steered angle $\alpha$ of the front wheels 3. The steering mechanism 11 is mechanically separated from the steering wheel 6.

The steering actuator 12 is an electric motor. The steering actuator 12 causes the rack shaft 26 to move in the vehicle width direction based on the signal from the control device 15, thereby to change the steered angle $\alpha$ of the left and right front wheels 3. Thus, the steering actuator 12 can change a ratio K of the steered angle $\alpha$ to the steering angle $\beta$ (K is an angle ratio and, in the present embodiment, corresponds to a virtual gear ratio) by changing the steered angle $\alpha$ of the front wheels 3 when the steering angle $\beta$ is not changing.

The steering device 10 includes a second rotation angle sensor 31 that detects the rotation angle $\theta$ of the steering actuator 12. The second rotation angle sensor 31 may be a known resolver or rotary encoder. Also, the steering device 10 includes a steered angle sensor 32 that detects the steered angle $\alpha$ of the front wheels 3. In the present embodiment, the steered angle sensor 32 includes a rack stroke sensor that detects a rack position, which is a position of the rack shaft 26 in the vehicle width direction, and detects the steered angle $\alpha$ of the front wheels 3 based on the rack position.

The control device 15 is an electronic control unit including a CPU, a memory, a storage device storing programs, and the like. The control device 15 is connected with the steering angle sensor 21, the torque sensor 22, the first rotation angle sensor 23, the second rotation angle sensor 31, and the steered angle sensor 32. Based on the signals from these sensors, the control device 15 acquires signals corresponding to the steering angle $\beta$, the steering torque Ts, the rotation angle $\theta$ of the reaction force actuator 13, the rotation angle $\theta$ of the steering actuator 12, and the steered angle $\alpha$. Also, the control device 15 is connected with a vehicle speed sensor 33 and a shift position sensor 34 and acquires therefrom a vehicle speed V and a shift position SP of a transmission 35.

The transmission 35 is a device that changes a power transmission mode from a travel drive source installed in the vehicle 1 to the wheels. For example, in a case where the vehicle 1 has an internal combustion engine installed as the travel drive source, the transmission 35 typically includes a gear/belt transmission that changes the driving force transmission mode from the internal combustion engine to the driving wheels. Also, in a case where the vehicle 1 has an electric motor installed as the travel drive source, the transmission 35 typically includes a power unit that changes the driving force transmission mode from the electric motor to the driving wheels.

In a case where the transmission 35 is an automatic transmission, the transmission 35 is typically provided with a parking position "P," a neutral position "N," a drive position "D," and a reverse position "R" which can be selected as the shift position SP indicating the driving force transmission mode. In addition, one or more numbered positions for forward motion (such as positions corresponding to the 1st gear (low) and the 2nd gear) may be provided. In a case where the transmission 35 is a manual transmission, the transmission 35 is typically provided with a neutral position "N," multiple numbered forward positions (corresponding to 1st to 5th gears, for example), and a reverse position "R."

The shift position SP of the transmission 35 is switched by a switching operation performed by the driver on a switching member such as a gear lever or a shift button. Note that the shift button may be a function button displayed on a touch panel display. The shift position sensor 34 acquires a signal corresponding to the shift position SP of the transmission 35 that is selected by the driver. The vehicle system including the control device 15 is configured such that ON/OFF thereof can be switched only when the transmission 35 is in the parking position "P" or the neutral position "N."

The control device 15 is connected with the reaction force actuator 13 and the steering actuator 12 and controls the reaction force actuator 13 and the steering actuator 12. The control device 15 controls the steering actuator 12 according to the steering angle $\beta$ and controls the reaction force actuator 13 according to the steered angle $\alpha$.

In the following, control of the control device 15 in the manual driving mode will be described concretely. Based on the steering angle $\beta$ detected by the steering angle sensor 21, the control device 15 calculates a target steered angle at that has a predetermined relationship with the steering angle $\beta$. Preferably, the control device 15 calculates the target steered angle at by multiplying the steering angle $\beta$ by a ratio K preset according to the shift position SP and the vehicle speed V, for example ($\alpha t = \beta \times K$). The ratio K is set such that the steered angle $\alpha$ of the front wheels 3 becomes the maximum when the steering wheel 6 is steered about one turn and a half (about 540 degrees) to the left and right during low speed travel or during travel with the reverse position "R" (during backward movement). The ratio K may be 0.02 to 0.15, for example.

Then, the control device 15 calculates a first current value A1 to be supplied to the steering actuator 12 based on a deviation $\Delta\alpha(=\alpha t - \alpha)$ between the target steered angle $\alpha t$ and the steered angle $\alpha$ to make the steered angle $\alpha$ approach the target steered angle at. Namely, the control device 15 performs feedback control of the steering actuator 12 based on the deviation $\Delta\alpha$. The larger the deviation $\Delta\alpha$ is, the greater the first current value A1 supplied to the steering actuator 12 becomes, the greater the output of the steering actuator 12 becomes, and the greater the changing speed of the steered angle α becomes.

For example, in a case where the driver accelerates the vehicle 1 by operating the accelerator while keeping the steering angle β of the steering wheel 6 constant, the control device 15 makes the ratio K smaller so that the wheels are steered with a smaller steered angle α as the vehicle speed V increases.

The control device 15 calculates a target reaction force torque Tt to be generated by the reaction force actuator 13 based on the steering state of the front wheels 3; more specifically, based on the deviation Δα. Preferably, the target reaction force torque Tt is calculated by multiplying Δα by a predetermined coefficient. Then, based on the calculated target reaction force torque Tt, the control device 15 calculates a second current value A2 to be supplied to the reaction force actuator 13. Preferably, the second current value A2 to be supplied to the reaction force actuator 13 is decided by referring to a predetermined map based on the target reaction force torque Tt. Note that in another embodiment, the control device 15 may decide the second current value A2 by referring to a predetermined map based on the deviation Δα. The target reaction force torque Tt and the second current value A2 are set to be larger as the deviation Δα regarding the steered angle α becomes larger.

The control device 15 supplies the second current value A2 to the reaction force actuator 13 to make the reaction force actuator 13 generate a driving force. The driving force generated by the reaction force actuator 13 is applied to the steering shaft 18 as the reaction force torque T acting against the driver's operation input. Thereby, the driver can receive a reaction force (resistive force) against the steering operation via the steering wheel 6.

Also, the control device 15 determines the gripping state of the steering wheel 6 by the driver based on the image captured by the interior camera 5. Specifically, the control device 15 extracts arm regions of the driver from the image captured by the interior camera 5 by using a known image analysis method. Further, the control device 15 determines whether the arms (hands) of the driver are gripping the steering wheel 6 based on the information on the extracted arm regions, and if it is determined that the steering wheel 6 is gripped, determines a gripping arm posture (positional relationship between the left and right arms).

Figure 2:
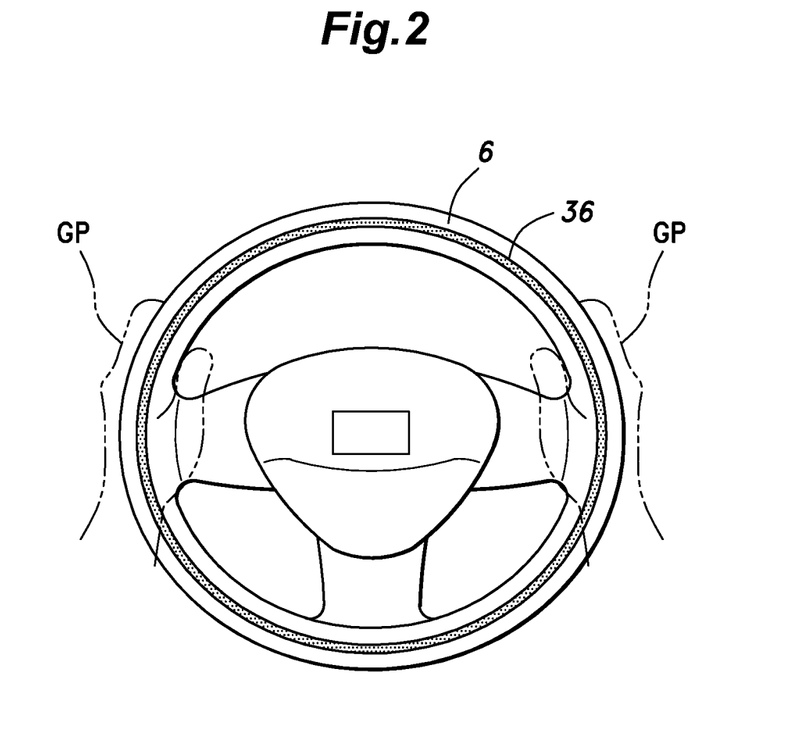
FIG. 2 is a front view of a steering wheel.

FIG. 2 is a front view of the steering wheel 6. As shown in FIG. 2, the steering wheel 6 is substantially circular in shape and is configured such that the driver can recognize the neutral position (namely, the rotational position where the steering angle β=0 degrees) from the direction of a spoke or an emblem. The steering wheel 6 has recommended grip positions GP set thereon as positions to be gripped by the driver, and the control device 15 stores the recommended grip positions GP.

When the steering angle β=0 degrees, a recommended grip position for the right hand GPR is the 3 o'clock position of the steering wheel 6 and a recommended grip position for the left hand GPL is the 9 o'clock position of the steering wheel 6. Here, an "X o'clock position" means a part that is positioned in the direction of "X o'clock," where the uppermost part in the neutral position is 0 o'clock, and this position changes with rotation of the steering wheel 6. The 3 o'clock position and the 9 o'clock position constitute left and right parts of the steering wheel 6 to be gripped when the steering wheel 6 is in the neutral position or when the vehicle is traveling straight and may be referred to as straight-travel grip positions GPS to be distinguished from other recommended grip positions GP.

The recommended grip positions GP may be set so as to change depending on the steering angle β of the steering wheel 6. For example, when the steering angle β is in an angle range from 180 degrees to the left to 180 degrees to the right, the recommended grip positions GPR, GPL for the left and right hands are the straight-travel grip positions GPS at 3 and 9 o'clock positions. When the steering angle β is in an angle range exceeding 180 degrees to the left, the recommended grip position for the left hand GPL is set at 7 to 8 o'clock position to change the grip position while the recommended grip position for the right hand GPR is set at 1 to 2 o'clock position to change the grip position. When the steering angle β is in an angle range exceeding 180 degrees to the right, the recommended grip position for the right hand GPR is set at 4 to 5 o'clock position to change the grip position while the recommended grip position for the left hand GPL is set at 10 to 11 o'clock position to change the grip position.

The steering wheel 6 is provided with an indicator 36. The indicator 36 is constituted of a light emitting member (for example, multiple LEDs) that is disposed at a position that can be viewed by the driver. In the present embodiment, the indicator 36 is formed in an annular shape over the entire circumference of the steering wheel 6. In another embodiment, multiple LEDs may be arranged annularly at intervals.

The control device 15 is configured to control the light emitting operation of the indicator 36. Specifically, the control device 15 decides the recommended grip positions GP, which are the positions on the steering wheel 6 to be gripped, according to the steering angle β of the steering wheel 6. While the automatic driving mode is executed by the automatic driving control device 4, the control device 15 controls the indicator 36 to display the recommended grip positions GP.

Figure 3A:
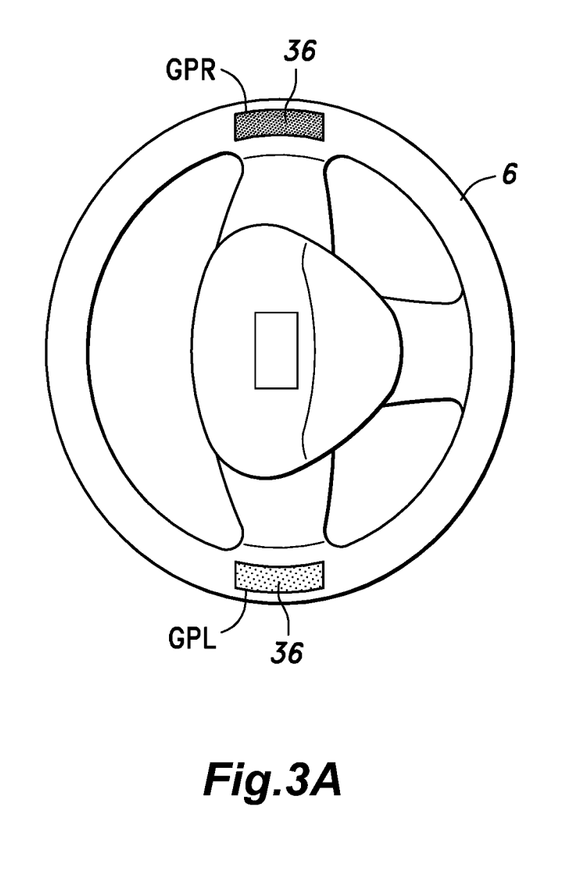
FIG. 3A is a front view of the steering wheel for showing an example of display of recommended grip positions when $\beta$ is 90 degrees to the left.
Figure 3B:
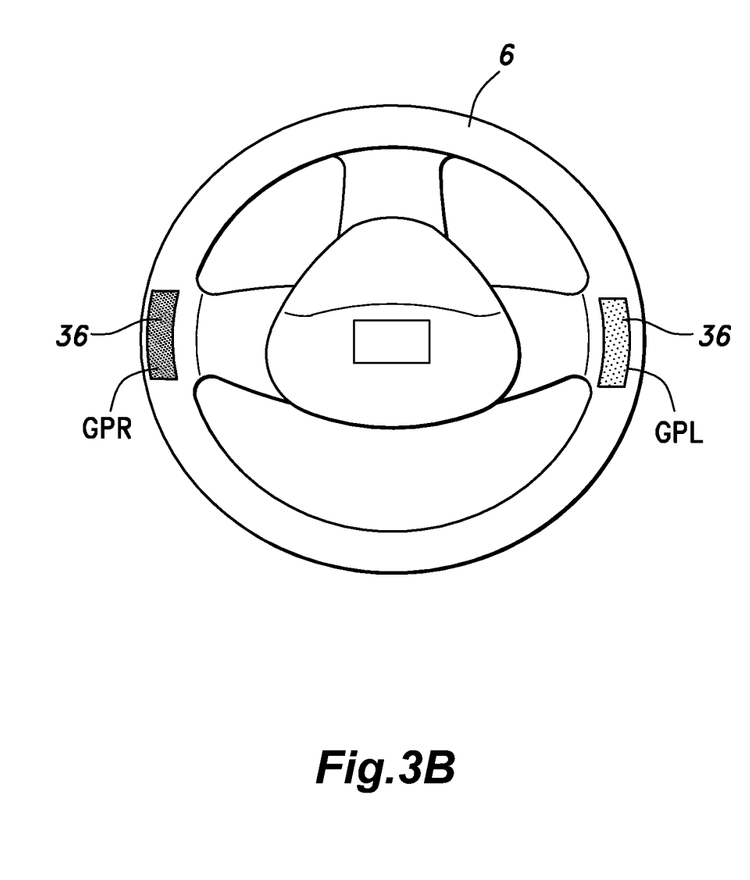
FIG. 3B is a front view of the steering wheel for showing an example of display of recommended grip positions when $\beta$ is 180 degrees to the left.

FIGS. 3A and 3B are front views of the steering wheel 6 showing examples of display of the recommended grip positions GP when β is 90 degrees to the left and when β is 180 degrees to the left, respectively. As shown in FIG. 3A, when the steering angle β=90 degrees, the control device 15 makes the indicator 36 emit light at the 3 o'clock position (the uppermost portion in the drawing) as the recommended grip position for the right hand GPR while the automatic driving mode is executed. In addition, the control device 15 makes the indicator 36 emit light at the 9 o'clock position (the lowermost portion in the drawing) as the recommended grip position for the left hand GPL. As shown in FIG. 3B, when the steering angle β=180 degrees, the control device 15 makes the indicator 36 emit light at the 3 o'clock position (the leftmost portion in the drawing) as the recommended grip position for the right hand GPR while the automatic driving mode is executed. In addition, the control device 15 makes the indicator 36 emit light at the 9 o'clock position (the rightmost portion in the drawing) as the recommended grip position for the left hand GPL.

As described above, since the control device 15 controls the indicator 36 to display the recommended grip positions GP to be gripped by the driver, it is possible to prevent the driver from erroneously recognizing the steering angle β of the steering wheel 6.

At this time, the control device 15 makes the color of the indicator 36 different between the recommended grip position for the right hand GPR and the recommended grip position for the left hand GPL. For example, the control device 15 makes the indicator 36 emit red light from a part corresponding to the recommended grip position for the right hand GPR and emit blue light from a part corresponding to the recommended grip position for the left hand GPL. This enables the driver to recognize the recommended grip position for the right hand GPR and the recommended grip position for the left hand GPL separately from each other, and therefore, the driver can recognize the recommended grip positions GP accurately.

As described above, in the manual driving mode, the control device 15 controls the steering actuator 12 and the reaction force actuator 13 according to the shift position SP and the vehicle speed V such that the ratio K between the steered angle α and the steering angle β becomes the set value. On the other hand, in the automatic driving mode, the automatic driving control device 4 controls the steering actuator 12 and the reaction force actuator 13 according to an action plan for automatic driving.

When the automatic driving control device 4 detects steering of the steering wheel 6 by an external force (override operation) while making the vehicle 1 autonomously travel in the automatic driving mode, the automatic driving control device 4 switches the driving mode from the automatic driving mode to the manual driving mode. Note that the override detection or determination method may be any known method, and the detailed description therefor is omitted here. When the driving mode is switched from the automatic driving mode to the manual driving mode, the control device 15 executes recognition matching control described in the following.

Figure 4:
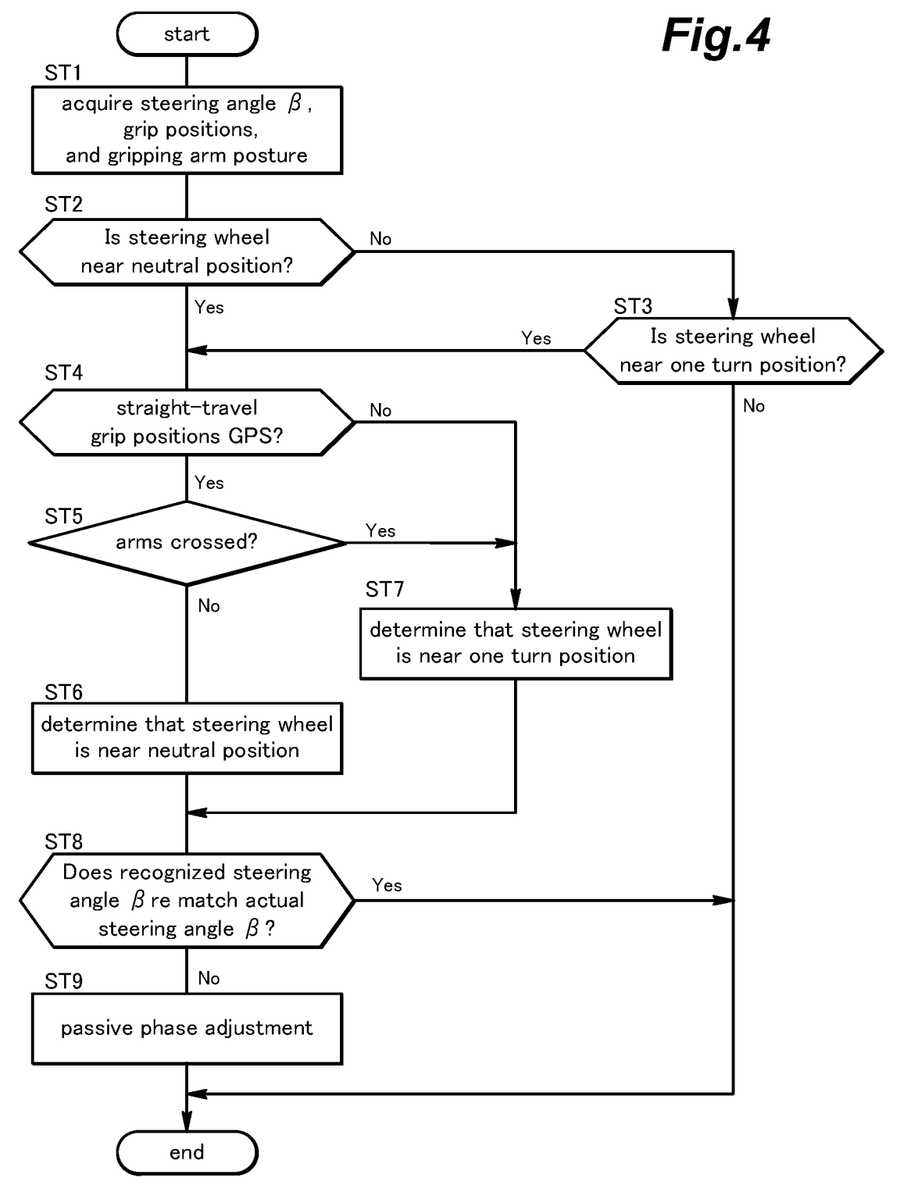
FIG. 4 is a flowchart of recognition matching control executed by a control device.

FIG. 4 is a flowchart of the recognition matching control. As shown in FIG. 4, when the driving mode is switched from the automatic driving mode to the manual driving mode, the control device 15 starts the recognition matching control. First of all, the control device 15 acquires the steering angle β of the steering wheel 6 from the steering angle sensor 21, the grip positions on the steering wheel 6 from the gripping sensor 7, and the gripping arm posture from the interior camera 5 (ST1).

Next, the control device 15 determines, based on the steering angle β, whether the steering wheel 6 is near the neutral position (ST2). Here, "near the neutral position" means a range of 90 degrees to the left and right with respect to the neutral position (β=0 degrees), namely, an angle range from 90 degrees to the left to 90 degrees to the right. When the steering wheel 6 is not near the neutral position (ST2: No), the control device 15 determines whether the steering wheel 6 is near a one turn position based on the steering angle β (ST3). Here, "near the one turn position" means a range of 90 degrees to the left and right with respect to the position rotated 360 degrees to the left or to the right from the neutral position, namely, an angle range from 270 degrees to the left to 450 degrees to the left or an angle range from 270 degrees to the right to 450 degrees to the right. If it is determined in step ST3 that the steering wheel 6 is not near the one turn position (No), the control device 15 ends the process.

If the determination in step ST2 is Yes or the determination in step ST3 is Yes, the control device 15 determines whether the grip positions are the straight-travel grip positions GPS (ST4). In this determine, not only when the grip positions of the both hands are the left and right straight-travel grip positions GPS but also when a single grip position is one of the left and right straight-travel grip positions GPS, it is determined that the grip positions are the straight-travel grip positions GPS. However, when the second grip position is a position other than the left and right straight-travel grip positions GPS, it is determined that the grip positions are not the straight-travel grip positions GPS.

When it is determined in step ST4 that the grip positions are the straight-travel grip positions GPS (Yes), the control device 15 determines whether the arms are crossed (ST5). Namely, the control device 15 determines whether the arms of the driver are crossed even when the steering wheel 6 is near the neutral position or near the one turn position (ST2: Yes or ST3: Yes).

When it is determined in step ST5 that the arms are not crossed (No), the control device 15 determines that a recognized steering angle βre, which is the steering angle β of the steering wheel 6 recognized by the driver, is near the neutral position (from 90 degrees to the left to 90 degrees to the right) (ST6). When it is determined in step ST5 that the arms are crossed (Yes) or it is determined in step ST4 that the grip positions are not the straight-travel grip positions GPS (No), the control device 15 determines that the recognized steering angle βre is near the one turn position (ST7). At this time, the control device 15 determines whether the recognized steering angle βre is near the leftward one turn position or near the rightward one turn position based on the crossing direction of the arms and/or the grip positions.

Subsequently, the control device 15 determines whether the recognized steering angle βre matches the actual steering angle β received from the steering angle sensor 21 (ST8). Here, "match" means that the recognized steering angle βre and the steering angle β are both near the neutral position, near the leftward one turn position, or near the rightward one turn position. If it is determined in step ST8 that the recognized steering angle βre matches the steering angle β (Yes), the control device 15 ends the process.

On the other hand, if it is determined in step ST8 that the recognized steering angle βre does not match the steering angle β (No), the control device 15 performs passive phase adjustment to change the ratio K such that the steered angle α approaches a recognized steered angle αre corresponding to the recognized steering angle βre (ST9).

As described above, the control device 15 determines in step ST4 to ST7 whether the recognized steering angle βre is near the neutral position (0 degrees) or near the one turn position (360 degrees) based on the grip positions on the steering wheel 6. And, when the determined recognized steering angle βre differs from the actual steering angle β (ST8: No), the control device 15 changes the ratio K in step ST9 such that the steered angle α approaches the recognized steered angle αre corresponding to the recognized steering angle βre. Thereby, it is possible to make the steered angle α of the front wheels 3 come close to the recognized steered angle αre, and this reduces the driver's sense of incongruity.

Figure 5:
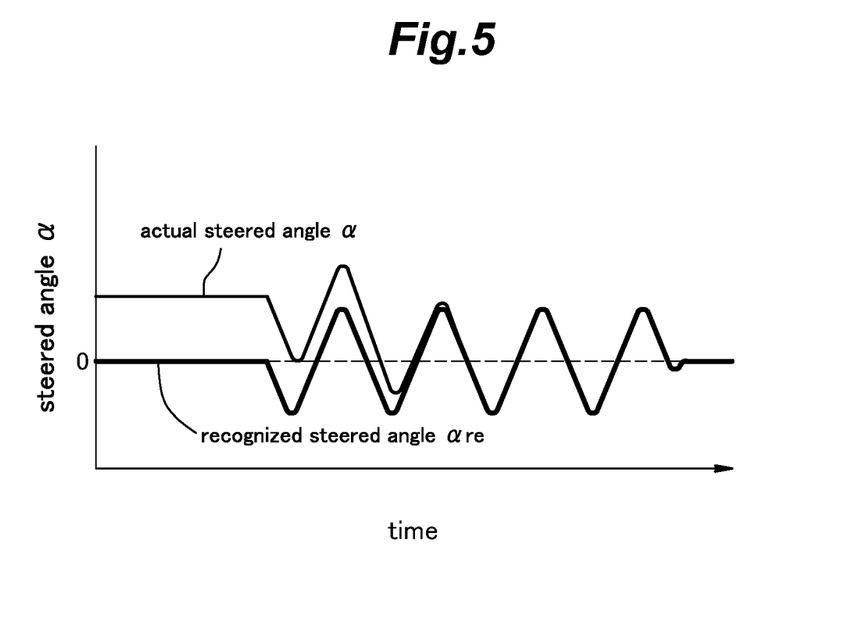
FIG. 5 is a time chart showing a change of the steered angle according to passive phase adjustment.

Here, the passive phase adjustment is control that changes the ratio K by driving the steering actuator 12 such that the steered angle α approaches the recognized steered angle αre while the driver is steering the steering wheel 6. FIG. 5 is a time chart showing a change of the steered angle α according to the passive phase adjustment. As shown in FIG. 5, the control device 15 performs the passive phase adjustment to change the ratio K during steering of the steering wheel 6 by the driver. This prevents the steering wheel 6 from being steered when the driver is not steering the front wheels 3. Thereby, the driver's sense of incongruity is reduced.

The passive phase adjustment in step ST9 is continued until the steered angle α matches the recognized steered angle αre, and is ended when the match is achieved. Thereby, the recognition matching control shown in FIG. 4 ends.

As described above, when the driver grips the straight-travel grip positions GPS (ST4: Yes), the control device 15 can determine that the driver recognizes that the vehicle is traveling straight or that the steering wheel 6 is near the neutral position (ST6). On the other hand, when the driver grips a position other than the straight-travel grip positions GPS (ST4: No), the control device 15 can determine that the driver recognizes that the vehicle is not traveling straight or that the steering wheel 6 is not near the neutral position but near the one turn position (ST7).

The control device 15 acquires the gripping arm posture determined based on the result of image capture by the interior camera 5 in step ST1 and determines whether the arms of the driver are crossed in step ST5. In the case where it is determined that the arms of the driver are crossed (ST5: Yes) even when the steering wheel 6 is near the neutral position or near the one turn position (ST2: Yes or ST3: Yes), the control device 15 can determine that the driver recognizes that the steering wheel 6 is rotated from the neutral position, namely, that the recognized steering angle βre is near the one turn position (ST7).

A concrete embodiment of the present invention has been described in the foregoing, but the present invention is not limited to the above embodiment and may be modified or altered in various ways. For example, in the above embodiment, the steering mechanism 11 which can change the ratio K between the steering angle β and the steered angle α was a steer-by-wire type. However, in another embodiment, it is possible to mechanically couple the steering wheel 6 with the steering mechanism 11 and to provide a variable gear ratio mechanism therebetween to constitute a variable gear ratio steering (VGS). It is also possible to configure the steering mechanism 11 as an active front steering (AFS). In the above embodiment, "near the neutral position" and "near the one turn position" are defined as the ranges of 90 degrees to the left and right with respect to the neutral position and with respect to the one turn position, respectively, but they may be defined as ranges of 60 degrees, 45 degrees, or 30 degrees to the left and right with respect to the neutral position and with respect to the one turn position, respectively. Also, in the above embodiment, the gripping sensor 7 was adopted as a grip position detection device that detects the driver's grip positions on the steering wheel 6, but the grip positions may be detected from the image captured by the interior camera 5. Besides, the concrete structure, arrangement, number, angle, etc. of each member or part as well as the concrete procedure may be appropriately changed within the scope of the present invention. Also, not all of the components shown in the above embodiment are necessarily indispensable and they may be selectively adopted as appropriate.

The invention claimed is:

1. A steering device for an automatic driving vehicle which can switch a driving mode between an automatic driving mode and a manual driving mode, the steering device comprising:
   a steering wheel which is configured to be rotatable one turn or more in each of leftward and rightward directions from a neutral position;
   a steering mechanism configured to change a ratio between a steering angle of the steering wheel and a steered angle of a wheel;
   a control device that changes the ratio of the steering mechanism; and
   a grip position detection device that detects grip positions on the steering wheel gripped by a driver,
   wherein when the driving mode is switched from the automatic driving mode to the manual driving mode in response to steering of the steering wheel while the automatic driving vehicle is traveling in the automatic driving mode, the control device determines whether a recognized steering angle which is the steering angle of the steering wheel recognized by the driver is near the neutral position or near a one turn position according to the grip positions on the steering wheel, and when the determined recognized steering angle differs from an actual steering angle, the control device changes the ratio such that the steered angle approaches a recognized steered angle corresponding to the recognized steering angle.

2. The steering device according to claim 1, wherein the control device changes the ratio such that the steered angle approaches the recognized steered angle while the driver is steering the steering wheel.

3. The steering device according to claim 1, wherein in a case where the grip positions are straight-travel grip positions that constitute left and right parts of the steering wheel to be gripped when the steering wheel is in the neutral position, the control device determines that the recognized steering angle is near the neutral position, and in a case where the grip positions are positions other than the straight-travel grip positions, the control device determines that the recognized steering angle is near the one turn position.

4. The steering device according to claim 1, further comprising an imaging device provided to capture an image of arms of the driver,
   wherein the control device determines whether the arms of the driver are crossed based on a result of image capture by the imaging device, and in a case where it is determined that the arms of the driver are crossed even when the steering wheel is near the neutral position or near the one turn position, the control device determines that the recognized steering angle is near the one turn position.

5. The steering device according to claim 1, further comprising an indicator provided on the steering wheel,
   wherein the control device is configured to control the indicator, and
   the control device decides recommended grip positions, which are positions on the steering wheel to be gripped, according to the steering angle, and controls the indicator to display the recommended grip positions.

6. The steering device according to claim 5, wherein the control device makes a color of the indicator different between a recommended grip position for a right hand and a recommended grip position for a left hand.

* * * * *